(12) United States Patent
Nakamura et al.

(10) Patent No.: US 6,668,075 B1
(45) Date of Patent: Dec. 23, 2003

(54) POSITION DETECTION APPARATUS AND METHOD

(75) Inventors: Ayako Nakamura, Kawasaki (JP); Masahiro Nakagawa, Yokohama (JP); Tatsuo Fukui, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/344,858

(22) Filed: Jun. 28, 1999

(30) Foreign Application Priority Data

Jun. 26, 1998 (JP) .......................................... 10-195128

(51) Int. Cl.[7] ................................................ G06K 9/00
(52) U.S. Cl. ........................ 382/144; 382/151; 348/95; 700/96
(58) Field of Search ................................ 382/151, 145, 382/141, 100, 144; 348/86, 87, 94, 95, 125, 126, 128, 129, 130, 131, 143; 700/95, 96, 212; 29/833; 438/16

(56) References Cited

U.S. PATENT DOCUMENTS

| | | | | |
|---|---|---|---|---|
| 5,008,702 A | * | 4/1991 | Tanaka et al. ................. 355/52 |
| 5,182,615 A | * | 1/1993 | Kurosawa et al. .......... 356/400 |
| 5,640,243 A | * | 6/1997 | Koitabashi et al. ......... 356/401 |
| 5,654,553 A | * | 8/1997 | Kawakubo et al. .......... 250/548 |
| 5,773,180 A | * | 6/1998 | Tomimatu ..................... 430/22 |
| 5,936,253 A | * | 8/1999 | Sugaya ........................ 250/548 |
| 5,969,800 A | * | 10/1999 | Makinouchi ................. 355/53 |
| 6,002,487 A | * | 12/1999 | Shirata ....................... 356/400 |
| 6,108,089 A | * | 8/2000 | Shiraishi ..................... 356/615 |
| 6,118,516 A | * | 9/2000 | Irie et al. ....................... 355/53 |
| 6,124,922 A | * | 9/2000 | Sentoku ........................ 355/53 |
| 6,549,271 B2 | * | 4/2003 | Yasuda et al. ................ 355/55 |

FOREIGN PATENT DOCUMENTS

JP          07071918 A     3/1995     ........... G01B/11/02

* cited by examiner

Primary Examiner—Timothy M. Johnson
Assistant Examiner—Ali Bayat
(74) Attorney, Agent, or Firm—Oliff & Berridge PLC

(57) ABSTRACT

A position detection apparatus for and method of detection the position of a pattern formed on a substrate (e.g., a wafer). The apparatus (100) comprises an illumination system capable of illuminating the pattern, and an imaging optical system arranged to converge light from the substrate (126) to form an image of the pattern. The apparatus further includes a detector (170) that photoelectrically detects the pattern image and generates a first output signal containing a representation of the image, and position detection system (174), electrically connected to the detector, that detects a position of the pattern based on the first output signal, and determines a deviation of the position from an ideal position. The position detection system then generates a second output signal containing deviation information representing the deviation. The apparatus further comprises a memory unit (M), electrically connected to the position detection system, that stores the deviation information contained in the second output signal. Further included in apparatus 100 is a correction process unit (B), electrically connected to the memory unit, that generates a correction value for eliminating the deviation based on the deviation information.

48 Claims, 4 Drawing Sheets

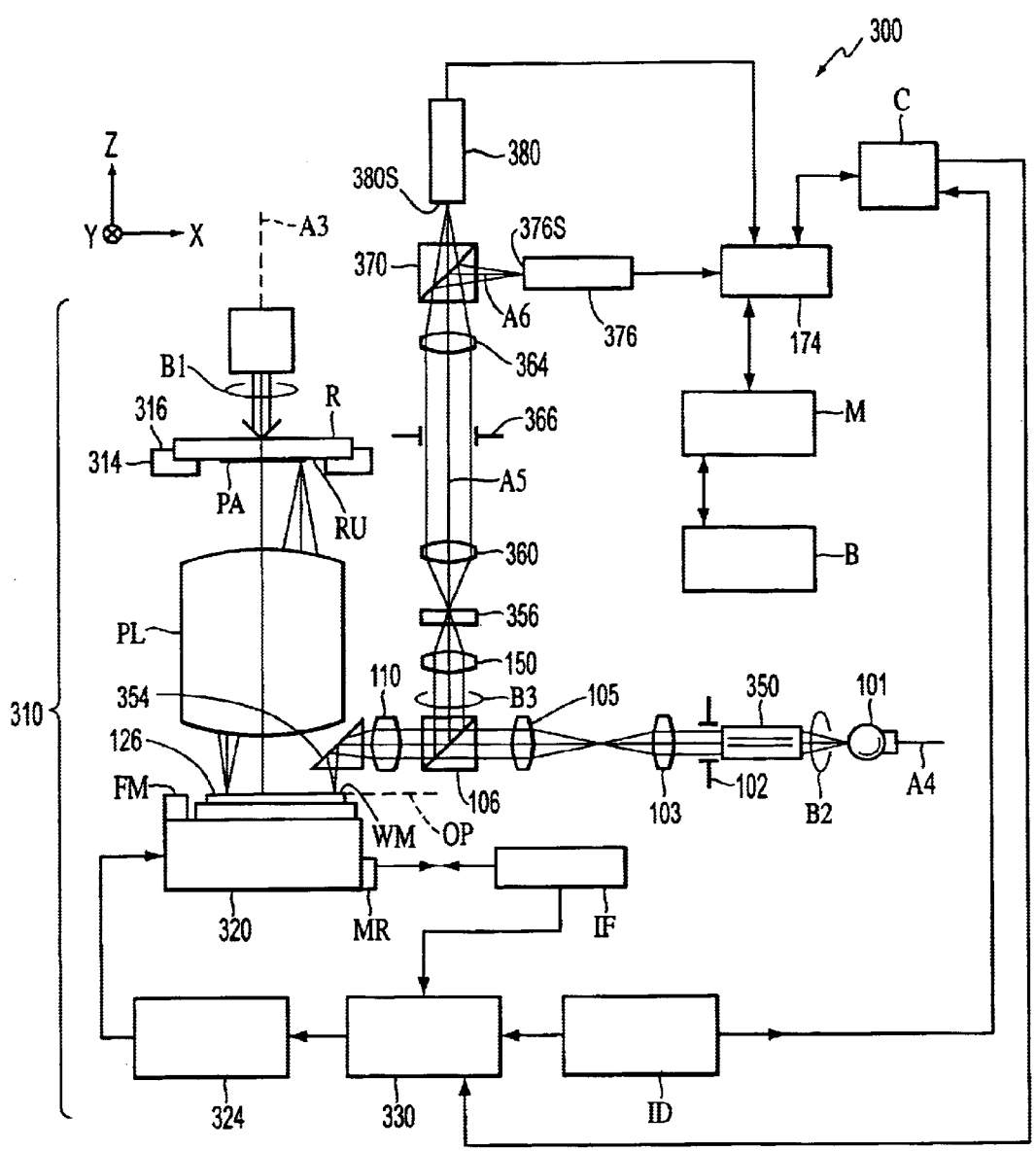
FIG. 7
FIG. 8a
FIG. 8b

POSITION DETECTION APPARATUS AND METHOD

FIELD OF THE INVENTION

The present invention relates to an apparatus for and method of detecting the position of a pattern formed on a photosensitive substrate used in a lithographic process for manufacturing semiconductor devices, liquid crystal display devices and the like, and more particularly relates to a position detection apparatus for and method of measuring the relative position between patterns.

BACKGROUND OF THE INVENTION

In photolithographic processes for manufacturing semiconductor devices, a pattern formed on a first object such as a mask or reticle is successively exposed through a projection optical system onto a second object, such as a substrate (e.g., a wafer) coated with a photosensitive material like photoresist. If there is a positional deviation between the resist pattern formed on the photosensitive substrate by exposure and a pattern already formed on the substrate by a previous process, problems arise such as a drop in the performance of the semiconductor device or a drop in manufacturing yield. Therefore, it is important to be able to measure the deviation in positions between such patterns.

An example of a prior art apparatus that measures the amount of positional deviation (i.e., the relative position) between patterns formed on a photosensitive substrate is disclosed in Japanese Patent Application No. Hei 8-273227. The prior art measurement apparatus disclosed therein uses an imaging optical system to detect the image of a resist pattern and the image of a predetermined pattern (circuit pattern) previously formed on substrate by a projection exposure process. The apparatus calculates the dimension (i.e., distance) between the patterns, namely the relative position, based on the resist pattern image and the pattern image formed (exposed) by the previous process.

However, the imaging optical system of the measurement apparatus in the prior art discussed above has optical members and the like such as lenses and glass plates. These optical members have fabrication errors, such as roughness in the ground surface, that arise during the optical member manufacturing process. Unfortunately, such errors affect the imaging characteristics of the apparatus. In particular, distortion is generated, which causes the position at which the pattern is imaged to be shifted from its ideal imaging position. Here, the ideal imaging position is that associated with a distortion-free imaging system. Thus, distortion arising from fabrication errors reduces the pattern position detection accuracy. To deal with the dramatic increase in recent years in the storage capacity of DRAMs, high-precision pattern position detection and high-precision measurement of the amount of pattern positional deviation are becoming more and more critical. Consequently, a reduction in the pattern position detection accuracy caused by fabrication errors in the measurement optical system can no longer be ignored.

In exposing a reticle pattern onto a wafer, the reticle and wafer need to be aligned so that the exposure levels are properly registered. One alignment method is the so-called FIA (Field Image Alignment) method. In the FIA method, an alignment mark provided on the wafer is illuminated perpendicularly by light having a broad wavelength band. The reflected light or diffracted light from the mark is converged and imaged onto a detector, such as a CCD image pickup surface by an imaging optical system. The position of the alignment mark is detected based on the detector signal. Then, alignment of the reticle and wafer is effected based on the position detection information of the alignment mark.

Even in exposure apparatus for semiconductors and the like, if residual fabrication errors are present in the optical members, detection errors will arise if the measurement position of the alignment mark changes due to the effect of distortion. This also leads to difficulties in accurately aligning the reticle and the wafer.

As described above, errors in the manufacture of an imaging optical system are caused by errors in the manufacture of the optical members, off-center errors such as errors in the assembly of the imaging optical system, as well as errors in the design of the imaging optical system. These all lead to the problem of reduced detection accuracy and ultimately, to errors in the position measurement of the patterns.

SUMMARY OF THE INVENTION

The present invention relates to an apparatus for and method of detecting the position of a pattern formed on a photosensitive substrate used in a lithographic process for manufacturing semiconductor devices, liquid crystal display devices and the like, and more particularly relates to a position detection apparatus for and method of measuring the relative position between patterns.

The present invention takes the aforementioned problems into consideration, and has the goal of providing an apparatus that can detect the position of a pattern with high precision by premeasuring information on the aberrations of the apparatus, and correcting the detected pattern position.

Accordingly a first aspect of the invention is a position detection apparatus for measuring the relative position of a pattern on a substrate. The apparatus comprises an illumination system capable of illuminating the pattern, and an imaging optical system arranged to converge light from the substrate and form an image of the pattern. The apparatus further comprises a detector that detects the image and generates a first output signal containing a representation of the image, and a position detection system, electrically connected to the detector, which detects a position of the pattern based on the first output signal, determines a deviation of the position from an ideal position, and generates a second output signal containing deviation information representing the deviation. Also included is a memory unit, electrically connected to the position detection system, that stores the deviation information contained in the second output signal. The apparatus also comprises a correction process unit, electrically connected to the memory unit, that generates a correction value for eliminating the deviation based on the deviation information.

A second aspect of the invention is a position detection method for detecting the position of a first predetermined pattern formed on a first object. The method comprises the steps of first, photoelectrically detecting a first image of the predetermined first pattern formed on the first object, then determining a positional of the first predetermined pattern based on the position of said first image in a detection field, then photoelectrically detecting a second image of a predetermined second pattern formed on a second object, then determining a position of the second predetermined pattern based on the position of second image on the second object, and then finally determining a positional deviation between the first and second images.

BRIEF DESCRIPTION OF THE DRAWINGS

FIG. 7 is a schematic diagram of a configuration of a second embodiment of the position detection apparatus of the present invention as used in combination with an exposure apparatus; and FIGS. 8a and 8b show the configuration of the marks on the correction substrate present on the wafer stage of the position detection apparatus of FIG. 7.

DETAILED DESCRIPTION OF THE INVENTION

The present invention relates to an apparatus for and method of detecting the position of a pattern formed on a photosensitive substrate used in a lithographic process for manufacturing semiconductor devices, liquid crystal display devices and the like, and more particularly relates to a position detection apparatus for and method of measuring the relative position between patterns.

Figure 1:
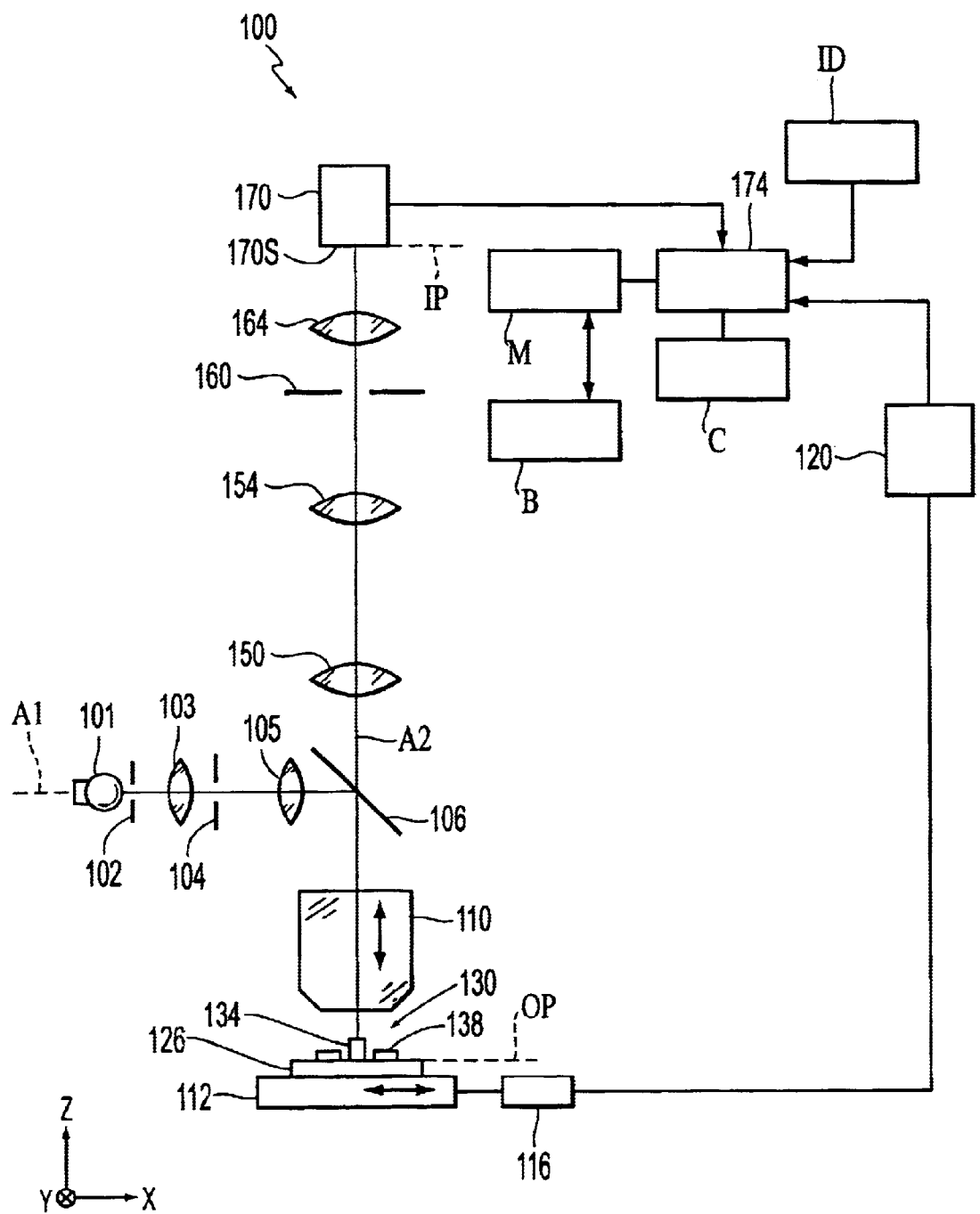
FIG. 1 is a schematic diagram of the configuration of a first embodiment of the position detection apparatus of the present invention.

With reference to FIG. 1, position detection apparatus 100 comprises, in order along a first optical axis A1, a light source 101, an aperture stop 102, a condenser lens 103, an illumination field stop 104, and a illumination relay lens 105. A half-prism 106 is also arranged along first optical axis A1 at the intersection with a second optical axis A2 arranged perpendicular to axis A1.

Apparatus 100 further includes, in order along optical axis A2 (proceeding in the direction in which light from light source 101 reflects from half-prism 106), a first objective lens 110 and a wafer stage 112, a drive apparatus 116 and a main control system 120. Wafer stage 112 is capable of moving two-dimensionally along the X and Y directions via drive apparatus 116, which is in electrical communication with the wafer stage, and main control system 120. Wafer stage 112 holds a wafer 126 having a raised alignment mark 130 comprising a central resist mark 134 and an outer etched mark 138 (see FIG. 2) previously made.

With continuing reference to FIG. 1, apparatus 100 further comprises, in order along optical axis A2 from half-prism 106 in the direction opposite first objective lens 110, a second objective lens 150, a second relay lens 154, an imaging aperture stop 160, a third relay lens 164, and a detector 170 having a detector surface 170S. Detector 170 may be, for example, a CCD array. Detector 170 is in electrical communication with a position detection unit 174. The apparatus also includes an input device ID, such as a keyboard, a correction unit C, and a memory unit M, all in electrical communication with position detection unit 174, and a correction amount calculation unit B in electrical communication with memory unit M. In addition, main control system 120 is also in electrical communication with position detection unit 174. In apparatus 100, elements 110, 150, 154 and 164 constitute an imaging optical system having an object plane OP at or near wafer 126 and an image plane IP at or near detector surface 170S. With continuing reference to FIG. 1, the operation of apparatus 100 is now explained. Light source 101 emits light (not shown) along axis A1, which passes through illumination aperture stop 102. Condenser lens 103 acts to uniformly irradiate illumination field stop 104. The illumination light emerging from illumination field stop 104 passes through illumination relay lens 105 and is reflected along optical axis A2 by half-prism 106 toward first objective lens 110. The latter illuminates marks 134 and 138 formed on wafer 126.

Drive apparatus 116 has a position detection system, (not shown) such as an encoder or interferometer, that detects the position in the two-dimensional X and Y directions of stage 112, and outputs position information pertaining to stage 112 to main control system 120. Drive apparatus 116 also has a drive system (not shown) like a motor, that moves stage 112 in the two-dimensional X and Y directions based on a control output (e.g., an electrical signal) from main control system 120.

The light beam reflected from marks 134 and 138 passes back through first objective lens 110 and half prism 106, and continues along optical axis A2, passing through second objective lens 150, second relay lens 154, imaging aperture stop 160 and third relay lens 164. An image of the marks (not shown) is formed on detector surface 170S of detector 170. The information in the image is then converted into an electrical output signal which is sent to position detection unit 174. The latter, in combination with correction unit C, then performs signal processing, as discussed in further detail below. The calculated position information for marks 134 and 138 is then sent to main control system 120.

Subsequently, main control system 120, which is electrically connected with a display apparatus (not shown), such as a CRT monitor, displays the relative positional deviation information for marks 134 and 138 as the measurement results. In addition, main control system 120 is electrically connected to a main control system (not shown) of an exposure apparatus that projects and exposes the pattern of the reticle through a projection optical system and onto wafer 126. Information related to the measurement results is sent to main control system 120. Then, based on the relative positional deviation information of marks 134 and 138, the main control system in the exposure apparatus electrically corrects the relative positional deviation information from the alignment apparatus that performed relative alignment of the reticle and wafer. Subsequently, the main control system in the exposure apparatus operates an illumination apparatus in the exposure apparatus. In this manner, the reticle is illuminated by the illumination apparatus, and the pattern of the illuminated reticle is projected and exposed through the projection system onto wafer 126.

As discussed above, a new reticle pattern is exposed (transferred) onto wafer 126 after the relative positional deviation portion of the wafer and the two marks 134 and 138 is corrected.

Accordingly, the desired reticle pattern layer can be exposed onto wafer 126 while properly building up layers. As a result, a satisfactory semiconductor device can be manufactured.

Main control system 120 shown in FIG. 1 may be configured so that it is electrically connected with a measurement recording apparatus (not shown). The relative positional deviation information of wafer 126 and marks 134 and 138 is then recorded by the measurement recording apparatus onto a recording medium. Furthermore, main control system 120 may also be configured so that the relative positional deviation information of wafer 126 and marks 134 and 138 recorded on the recording medium is input into the main control system of the exposure apparatus via a read apparatus (not shown) attached to the exposure apparatus.

Figure 2:
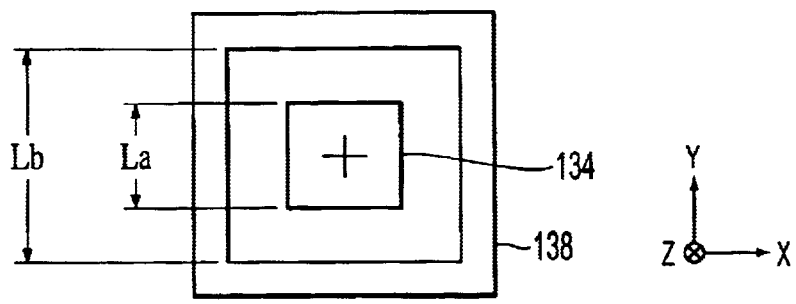
FIG. 2 is a plan view of an exemplary alignment mark suitable for use in the present invention, comprising a inner resist pattern and an outer etched pattern.
Figure 3:
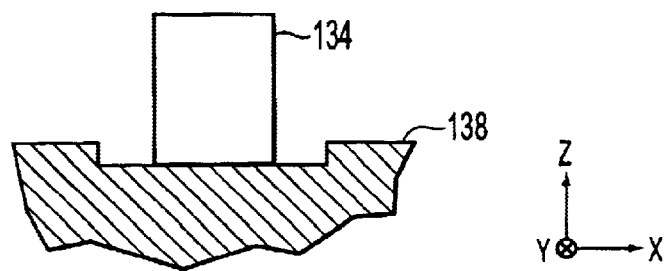
FIG. 3 is a side view of the alignment mark of FIG. 2.
Figure 4:
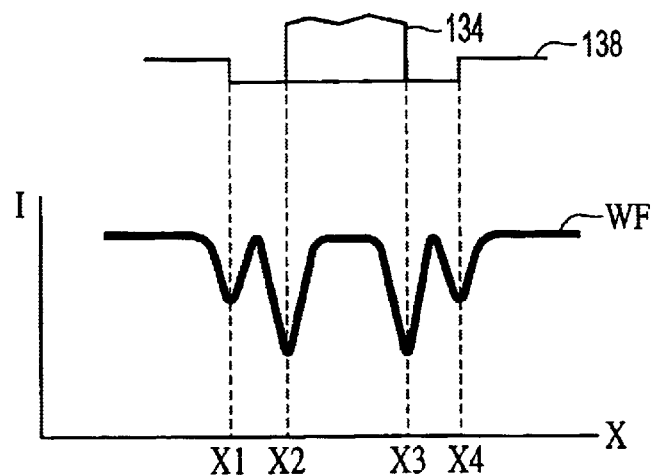
FIG. 4 shows the X-direction waveforms signal due to light reflecting from the alignment mark of FIG. 2 and detected by the detector in FIG. 1.

With reference now to FIGS. 3–6, the procedure for calculating the position of marks 134 and 138, as well as their relative position is explained. For simplicity, the detection of a pattern position in the one-dimensional direction of the X-axis is considered. FIG. 3 shows the cross-sectional shape in the XZ plane of mark 130 shown in FIG. 2. With reference now to FIG. 3, mark 134 is a resist pattern formed on the inside of mark 138, which is an etched pattern. FIG. 4 shows the waveform WF of the detection signal of marks 134 and 138 the X-axis direction. Waveform WF has peak positions X1–X4. First, to calculate a center position Xo of mark 138, peak positions X1 and X4 of the detection signal in the X-axis direction are detected. Center position Xo is then calculated by the relation Xo=(X1+X4)/2. Likewise, to calculate a center position X1 of mark 134, peak positions X2 and X3 of the detection signal in the X- axis direction are detected. Center position X1 is then calculated by the relation Xi=(X2+X3)/2. Accordingly, difference ΔX between Xo and X11 is the positional deviation amount (relative position) between mark 138 and mark 134 in the X-direction. However, positions X1 to X4 includes error components, particularly distortion due to optical aberrations. Accordingly, positional deviation amount ΔX does not precisely indicate the true positional deviation amount between mark 134 and mark 138.

Figure 5:
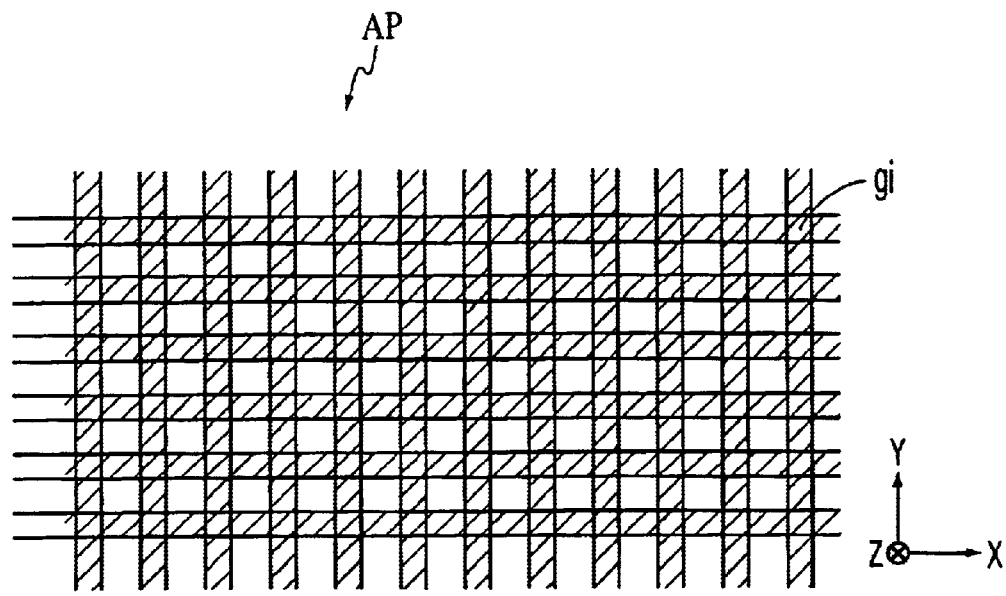
FIG. 5 is a plan view of the mark configuration used in calculating the positional deviation information using the apparatus of FIG. 1.

Accordingly, the present invention eliminates such error components by means of the procedure discussed below. With reference now to FIG. 5, the position of each grid intersection gi of lattice pattern AP (pattern for correction) for the measurement of the positional deviation information is measured using a position detection apparatus (e.g., coordinates measurement apparatus or the like) (not shown) separate from position detection apparatus 100 of the present invention. The measurement results pio(X) (i=1, 2, . . . ) are stored in memory unit M via input device ID. Accordingly, pattern AP is formed on the correction substrate. If pattern AP is formed in accordance with design values, there is no need to premeasure the position (position of each grid intersection gi) of the pattern of the correction substrate using the position detection apparatus. The information related to the position (position of each grid intersection gi) of pattern AP in accordance with design values, namely pio(X) (wherein, i=1, 2, . . . ), may be stored in memory unit M via input device ID.

Next, with reference again also to FIG. 1, pattern AP is measured using position detection apparatus 100 of the present invention. First, a correction substrate having pattern AP is mounted on stage 112. Main control system 120 then moves stage 112 by the operation of drive apparatus 116 and sets pattern AP of the correction substrate in object plane OP. Then, position detection unit 174 photoelectrically detects, through detector 170, the image of pattern AP formed on detector surface 170S.

Subsequently, position detection unit 174 stores measurement results pi(X) (wherein, i=1, 2, . . . ) related to each grid intersection gi of correction pattern AP in memory unit M. Then, correction amount calculation unit B reads the two types of data (pio(X) and pi(X)) stored in memory unit M, and calculates correction amount Δp(X). In other words, correction amount calculation unit B calculates correction data Δp(X) for the positional deviation caused by optical aberrations errors in manufacturing, or electrical characteristics of position detection apparatus, using the following relation:

$$\Delta p(X)=pi(X)-pio(X).$$

Figure 6:
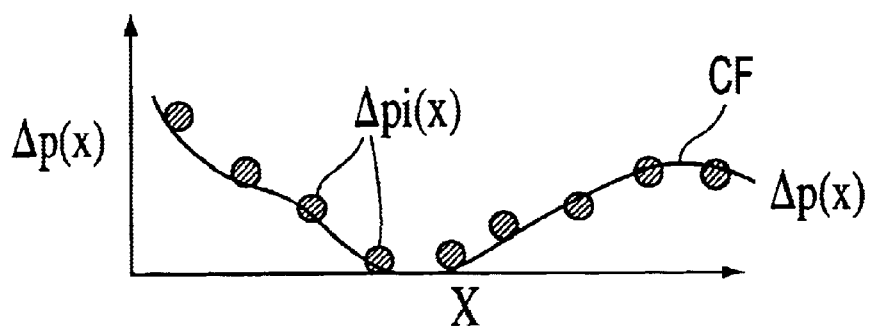
FIG. 6 is a plot of the positional deviation information correction function obtained by employing the mark configuration of FIG. 5.

With reference also now to FIG. 6, correction amount calculation unit B then performs a polynomial approximation on this data and stores it in memory unit M as a positional deviation correction function CF. Accordingly, positional deviation function CF corresponds to the positional deviation information generated depending on the position of the image of pattern AP received by detector surface 170S.

If pattern AP is formed in accordance with the design values, correction amount calculation unit B approximates the data based on Δp(X)=pi(X), which can be stored in memory unit M as positional deviation correction function CF shown in FIG. 6. Next, the correction substrate having pattern AP is removed from stage 112, and wafer 126 is mounted thereon, with each of marks 134 and 138 set in object plane OP.

Detector 170 then detects the image of pattern marks 134 and 138 formed on detector surface 170S and the image is converted to output signals which are sent to position detection unit 174. The latter detects the relative positional deviation of marks 134 and 138 as the actual patterns to be measured, based on the output signal from detector 170.

Detection signals X1–X4 related to the relative positional deviation of two pattern marks 134 and 138 obtained by position detection unit 174 based on the output signal from detector 170 are then electrically corrected by correction unit C. The latter acquires detection signals X1–X4 obtained by position detection unit 174, acquires via the position detection unit the information (positional deviation correction function Δp(X)) related to the correction amount stored in memory unit M by correction amount calculation unit B, and corrects the detection signals. This is accomplished by performing a predetermined calculation. In other words, for peak positions X1 and X4 obtained by position detection unit 174, correction unit C calculates:

$$X1'=X1-\Delta p(X1)$$

$$X4'=X4-\Delta p(X4).$$

Then, correction unit C calculates a corrected center position Xo'=(X1'+X4')/2 for mark 138. To calculate Xo' with greater precision, it is preferred that measurements be made using only the data in the range of length Lb (FIG. 2) in the unmeasured direction of mark 138 when calculating Δp(X) used to make the correction.

Likewise, for peak positions X2 and X3, the following values are calculated:

$$X2'=X2-\Delta p(X2)$$

$$X3'=X3-\Delta p(X3)$$

A corrected center position Xi'=(X2'+X3')/2 of mark 134 is then calculated. To calculate Xi' with greater precision, only the data in the range of length La (FIG. 2) in the unmeasured direction of mark 134 be used when calculating Δp(X) used to make the correction. Then, the corrected positional deviation amount for etching pattern 138 and resist pattern 134 in the X-direction can be calculated as the differential ΔX' between Xo' and Xi'.

Pattern AP was used in the above procedure to calculate positional deviation information correction function Δp(X).

However, the calculation can also be performed using marks 134 and 138 to be measured in place of pattern AP. For example, consider the case wherein wafer 126 upon which pattern 134 and the like is formed is measured along a predetermined direction, and the result is assigned a value $pi(X)$. Next, the wafer 126 (the same wafer) is measured with an orientation rotated 180° with respect to the predetermined direction, and that result is assigned a value $pi180(X)$. The positional deviation information $\Delta p(X)$ for marks 134 and 138 is then calculated by the following condition:

$$\Delta p(X)=(pi(X)+pi180\ (X))/2.$$

Positional deviation correction function $\Delta p(X)$ can then be calculated by performing a polynomial approximation:

$$\Delta p(X)=pi(X)-(pi(X)+p180\ (X))/2.$$

This procedure measures mark 134 and the like by apparatus 100 without premeasuring pattern AP with another measurement apparatus, and obtains the positional deviation correction function CF.

The present invention is not limited to the signal correction processing technique discussed above. For example, another preferred technique may also be performed. Specifically, position detection unit 174 first calculates the relative positional deviation (Xo–Xi) of marks 134 and 138 that include errors, as shown in FIG. 2, based on the output signals from detector 170:

$$Xo-Xi=(X1+X4)/2-(X2+X3)/2.$$

Next, correction unit C acquires via position detection unit 174, the information (positional deviation correction function $\Delta p(X)$) related to the correction amount stored in memory unit M by correction amount calculation unit B, and corrects the relative positional deviation (Xo–Xi) calculated by arithmetic processing by position detection unit 174.

In other words, correction unit C calculates the correction value (or correction amount) $\Delta c$ by $$\Delta c=[\Delta p(1)+\Delta p(4)]/2-[\Delta p(2)+\Delta p(3)]/2.$$

Correction unit C can accurately calculate the relative positional deviation (Xo'–Xi') of marks 134 and 138 by performing the following operations:

$$Xo'-Xi'=(Xo-Xi)-\Delta c=(X1+X4)/2-(X2+X3)/2-[(\Delta p(1)+\Delta p(4))/2-(\Delta p(2)+\Delta p(3))/2]$$

This type of signal correction processing technique can also be applied in position detection unit 174 and correction unit C of yet another preferred embodiment of the present invention, as discussed in greater detail below with respect to FIG. 7. In this case, X1 and X4 correspond to the output signal of the index mark present on an index plate 356 discussed later, in the X- direction, and X2 and X3 correspond to the output of a wafer mark M in the X-direction.

With reference now to FIG. 7, a position detection apparatus 300 according to the second embodiment of the present invention is now described in the context of its use with a projection exposure apparatus 310 for manufacturing semiconductors and the like. In apparatus 300, elements corresponding to those of apparatus 100 of FIG. 1 are given the same reference number or symbol.

First, projection exposure apparatus 310 is explained. Projection exposure apparatus 310 comprises, along an optical axis A3, an illumination system 314, and a reticle stage 316 for holding a reticle R having an underside Ru upon which a pattern PA resides. Adjacent reticle stage 316 is a projection optical system PL and an XY wafer stage 320 for holding wafer 126. A reference mirror MR is affixed to stage 320, and the position thereof is measured by a high-precision laser interferometer IF in optical communication with the wafer stage. Projection exposure apparatus 310 further includes a stage control system 324, which includes a drive apparatus. Stage control system 324 drives stage 320 in the XY plane.

With reference now also to FIGS. 8a and 8b, apparatus 310 further includes a correction substrate FM having respective line-shaped marks 326 and 328 extending a length Lx in the X-direction and Ly in the Y-direction. The pattern surface (surface whereon the marks are formed) of correction substrate FM is set so that it is substantially the same height as the surface of wafer 126.

Apparatus 310 further includes a main control system 330 in electrical communication with stage control system 324 and interferometer IF, and input device ID in electrical communication with the main control system and correction unit C.

With continuing reference to FIG. 7, the operation of projection exposure apparatus 310 is now explained. A light beam B1 from illumination optical system 314 illuminates reticle pattern PA of reticle R, which is mounted on reticle stage 316. Illuminated reticle pattern PA is transferred and exposed through projection optical system PL onto wafer 126 mounted on wafer stage 320. Reference mirror MR is affixed to wafer stage 320, and the stage position is measured with laser interferometer IF and adjusted with stage control system 324.

Position detection apparatus 300 comprises, along an optical axis A4, light source 101, an optical fiber 350, aperture stop 102, condenser lens 103, relay lens 105 and half-prism 106. Half-prism 106 is arranged at the intersection of axis A4 and an optical axis A5 arranged perpendicular thereto. Continuing along axis A4, apparatus 300 further includes first objective lens 110 and a reflecting prism 354. Along optical axis A5 proceeding from half-prism 106, apparatus 300 further includes second object lens 150, an index plate 356 having a reference mark (not shown), a relay lens system comprising relay lenses 360 and 364 with an aperture stop 366 therebetween, and a second half prism 370. The latter creates an additional optical axis A6. Adjacent second half prism 370 along optical axes A5 and A6 are first and second detectors 376 and 380, respectively, each having detection surfaces 376S and 380S, respectively. Detectors 376 and 380 detect light signals corresponding to the X-direction and the Y-direction, respectively, and are in electrical communication with position detection unit 174. The latter is also in electrical communication with correction unit C and memory unit M, which is in electrical communication with correction amount calculation unit B, as described above in connection with apparatus 100.

The operation of position detection apparatus 300 is now described based on projection exposure apparatus 310 employing an FIA system to detect a position of wafer 126 so as to align reticle R and wafer 126. An illumination light beam B2 is emitted from light source 101 and passes through optical fiber 350, which changes the light beam to an appropriate illumination light beam upon exiting the fiber at or near illumination aperture stop 102. The illumination light emerging from illumination field stop 102 passes through illumination relay lens 105, half prism 106, first objective lens 110 and reflecting prism 354, and then illuminates a mark WM on wafer 126. The light beam reflected from mark WM again passes through reflecting prism 354 and first objective lens 110, and is then reflected by half prism 106 to travel along optical axis A5 to form a reflected light beam B3. The latter passes through second objective lens 150 and forms an image (not shown) of the mark WM onto index plate 356. The wafer mark image passes through relay lens system 360–366 and half prism 370, and is reimaged on detector surface 376S for the X-direction and detector surface 380S for the Y-direction. Position detection unit 174 and correction unit C calculate the position information of wafer mark WM based on output signals from detectors 376 and 380, and send this information to main control system 330. Accordingly, as discussed earlier, the calculated position information of wafer mark WM includes residual aberrations, particularly distortion, for imaging the marks and positional deviation errors due to fabrication errors and the electrical characteristics of the detection system.

Furthermore, the aberrations in position detection apparatus 300 are caused by errors such as assembly errors and fabrication errors of the optical elements therein. Accordingly, position detection apparatus 300 of the present invention eliminates this positional deviation error by the procedure explained below. First, before calculating the position information of wafer mark WM, distortion is measured using correction substrate FM. The latter includes a distortion measurement pattern the same as or similar to pattern AP (FIGS. 8a and 8b) preformed as a positional deviation information measurement pattern to calculate the image distortion information (distortion) as one piece of information on the positional deviation caused by residual aberration associated with the formation of the image of wafer mark WM. For purposes of simplicity, one-dimensional direction of the X-axis direction is considered. Main control system 330 moves XY stage 320 by means of stage control system 324, and sets the surface (pattern surface) of correction substrate FM provided on one edge of XY stage 320 in object plane OP the position detection system.

Each time XY stage 320 is moved by just a predetermined movement amount, detector 376 repeats the operation of photoelectrically detecting the image of the X-direction distortion measurement mark on correction substrate FM. Thus, each time XY stage 320 is moved by just a predetermined amount, the X-direction distortion measurement mark having length Lx (FIG. 8a) is photoelectrically detected through detector 376. The position of the X-direction distortion measurement mark is respectively detected by position detection unit 174 based on the output signal from detector 376. This measurement result is assigned q(X). In addition, each time the position of XY stage 320 at this time is measured by laser interferometer IF, and XY stage 320 is moved by just a predetermined movement amount by stage control system 324, the position of the X-direction distortion measurement mark is respectively detected by detector 380 based on the output from laser interferometer IF as the stage position detection system. This measurement result is assigned qo(X).

In this manner, position detection unit 174 stores in memory unit M the two types of measurement data (q(X) and qo(X)) measured as described above. Subsequently, correction amount calculation unit B reads the two types of data (q(X) and qo(X)) stored in memory unit M, and calculates correction amount $\Delta q(X)$. In other words, correction amount calculation unit B performs a polynomial approximation of $\Delta q(X)=q(X)-qo(X)$, and stores that in memory unit M as the positional deviation information correction function. Accordingly, the positional deviation function corresponds to the information on positional deviation generated depending on the position of the distortion measurement mark in each direction in the exposure region (in the detection field) of detector 376.

The procedure discussed above included an example wherein correction amount $\Delta q(X)$ was calculated using the distortion measurement mark in the X-direction. However, correction amount $\Delta q(Y)$ is also calculated by the same technique as above using the distortion measurement mark in the Y-direction, and is subsequently stored in memory unit M. It is further preferable when measuring the distortion measurement mark in the X-axis direction to align region Lx in the Y-direction, which is the unmeasured direction, with the length of the unmeasured direction used for measuring during actual alignment of the alignment marks. If measurement and arithmetic processing are then performed, it becomes possible to correct the mark position more precisely, since the effect of excess information outside the marks can be reduced.

With continuing reference to FIG. 7, next, main control system 330 moves XY stage 320 by means of stage control system 324. Wafer mark WM formed on wafer 126 on XY stage 320 is set in object plane OP. Then, position detection unit 174 photoelectrically detects through image pickup units 376 and 380, the image of wafer mark WM formed on detector surfaces 376 and 380. Subsequently, position detection unit 174 detects the positional deviation (positional deviation of wafer mark WM with respect to index plate 356) of the edge of wafer mark WM as the actual pattern to be measured, based on the output signals from detectors 376 and 380. Position detection unit 174 then outputs signal Xn related to the positional deviation in the X-direction of wafer mark WM and signal Yn related to the positional deviation in the Y-direction of wafer mark WM Detection signals Xn and Yn are then electrically corrected by correction unit C. Correction unit C acquires the detection signals Xn and Yn obtained by position detection unit 174 and acquires by means of position detection unit 174 positional deviation correction functions $\Delta q(Xn)$, $\Delta q(Yn)$ related to the correction amounts stored in memory unit M by correction amount calculation unit B. Correction unit C then corrects the detection signals obtained by position detection unit 174 by performing a predetermined arithmetic operation. In other words, correction unit C performs the following arithmetic operations on position signals Xn and Yn:

$$Xn'=Xn-\Delta q(Xn)$$

$$Yn'=Yn-\Delta q(Yn)$$

Correction unit C then respectively calculates corrected center position X' in the X-direction and center position Y' in the Y-direction of wafer mark WM.

In this manner, when performing signal arithmetic processing of the detector signal, distortion correction $Xn'=Xn-\Delta q(Xn)$ is calculated in correction unit C based on the positional deviation correction function for the detection result Xn of each edge of the wafer mark to be measured. The corrected center position X' of the mark is thereby calculated. Detection of the mark position in the Y-axis direction is performed in the same manner as in the X-axis direction.

Although correction is performed in the present invention based on the positional deviation information from measuring the distortion measurement pattern, the position data can also be corrected using the position detection mark itself, which is the object to be measured. In this case, as explained above, a more precise correction is possible by taking two measurements: one in a predetermined direction and one in the direction reversed by 180°, and calculating the positional deviation correction function.

In exposure apparatus 310 and position detection apparatus 300 (FIG. 7), correction substrate FM was provided on stage 320 to measure the effect of measurement error due to aberrations remaining in the position detection apparatus. However, position detection apparatus 300 may also be constituted so that correction substrate FM is mounted on stage 320 without providing stage 320 with correction substrate FM, as in apparatus 100 of FIG. 1., and so that the effect of measurement errors due to aberrations are measured.

Also, correction is performed in the present invention based on positional deviation information by means of correction unit C. Thus, the mark position can be continuously and stably detected even if, for example, the number of alignment marks changes.

By applying the present invention to the alignment system of the superposition measurement apparatus disclosed in Japanese Patent Application Kokai No. Sho 62-32614, superposition measurement can be performed without being affected by optical aberrations, particularly distortion.

Furthermore, although the above mode for carrying out the present invention described an example wherein the pattern is viewed (detected) in reflection epi-illuminated, it will be a understood that it can also be viewed (detected) in transmission.

The present invention is not limited to positional deviations caused by optical aberrations.

Indeed, the present invention can also correct positional deviations caused by electrical characteristics of the detection system, such as a CCD detector.

Also, in the present invention, the reticle and wafer can be aligned with high precision by using an exposure apparatus that applies the present invention. Accordingly, a semiconductor device manufacturing method can be provided having high performance and improved throughput.

Position detection 174 and correction unit C related above can also be constructed as a single arithmetic processing system. Furthermore, can also be constituted so that memory unit C-SM and correction amount calculation unit B are provided inside the arithmetic processing system.

While the present invention has been described in connection with preferred embodiments, it will be understood that it is not limited to those embodiments. On the contrary, it is intended to cover all alternatives, modifications and equivalents as may be included within the spirit and scope of the invention as defined in the appended claims.

What is claimed is:

1. A position detecting apparatus comprising:
   a detection optical system arranged to obtain an optical information including a position of an object to be detected;
   a detector including a detecting area and arranged to convert the optical information into an electrical signal;
   a memory unit that stores an error information arising according to a detecting position of the detecting area;
   a correction processor, electrically connected to the detector and the memory unit, that corrects the electrical signal based on the error information, and generates a correcting signal, the error information having been obtained at a time prior to a time when the optical information that is being corrected was obtained from the detection optical system; and
   a detecting unit, electrically connected to the correction processor, that detects a position of the object based on the correcting signal.

2. The position detecting apparatus according to claim 1, further comprising an illumination system arranged to illuminate a detecting pattern as the object formed on a detecting substrate;
   wherein the detection optical system includes an imaging optical system arranged to form an image of the detecting pattern based on light from the detecting pattern.

3. The position detecting apparatus according to claim 1, wherein the error information stored by the memory unit includes a measuring information obtained by a criterion object.

4. The position detecting apparatus according to claim 3, wherein the error information further includes a manufacturing error of the criterion object.

5. The position detecting apparatus according to claim 3, wherein the measuring information of the criterion object includes a first detection information with respect to the criterion object set under a first condition and a second detection information with respect to the criterion object set under a second condition.

6. The position detecting apparatus according to claim 1, further comprising a stage that supports a detecting substrate having a detecting pattern as the object, and that has a criterion object to correct a detecting result;
   wherein the error information stored by the memory unit includes a measuring information of the criterion object obtained by using the position detecting apparatus.

7. The position detecting apparatus of claim 1, wherein the stored error information is based on at least one detected distance within a known pattern.

8. The position detecting apparatus of claim 1, wherein the correcting signal compensates for error in the electrical signal due to at least one of a manufacturing error of the detection optical system, a residual optical error of the detection optical system and an electrical error caused by a manufacturing error of the position detecting apparatus.

9. The position detecting apparatus of claim 1, wherein the stored error information is a manufacturing error of the detection optical system is at least one of an error in the manufacture of optical members, off-center errors and errors in the design of the detection optical system.

10. The position detecting apparatus of claim 1, wherein the error in the manufacture of the optical member represents a surface roughness of the optical member.

11. A position detecting apparatus comprising:
    a detection optical system arranged to obtain an optical information including a position of an object to be detected;
    a detector including a detecting area and arranged to convert the optical information into an electrical signal;
    a memory unit that stores an error information about the position detecting apparatus with respect to at least one of a manufacturing error in the detection optical system, a residual optical error in the detection optical system and an electrical error caused by a manufacturing error in the position detecting apparatus;
    a correction processor, electrically connected to the detector and the memory unit, that corrects the electrical signal based on the error information in order to compensate for at least one of the manufacturing error of the detection optical system, the residual optical error of the detection optical system and the electrical error caused by the manufacturing error of the position detecting apparatus, and generates a correcting signal; and
    a detecting unit, electrically connected to the correction processor, that detects a position of the object based on the correcting signal.

12. The position detecting apparatus according to claim 11, further comprising an illumination system arranged to illuminate a detecting pattern as the object formed on a detecting substrate;

wherein the detection optical system includes an imaging optical system arranged to form an image of the detecting pattern based on light from the detecting pattern.

13. The position detecting apparatus according to claim 11, wherein the error information stored by the memory unit includes a measuring information obtained by a criterion object.

14. The position detecting apparatus according to claim 13, wherein the error information further includes a manufacturing error of the criterion object.

15. The position detecting apparatus according to claim 13, wherein the measuring information of the criterion object includes a first detection information with respect to the criterion object set under a first condition and a second detection information with respect to the criterion object set under a second condition.

16. The position detecting apparatus according to claim 11, further comprising a stage the supports a detecting substrate having a detecting pattern as the object, and that has a criterion object to correct a detecting result;

wherein the error information stored by the memory unit includes a measuring information of the criterion object obtained by using the position detecting apparatus.

17. The position detecting apparatus of 11, wherein the error information having been obtained at a time prior to a time when the optical information that is being corrected was obtained from the detection optical system.

18. An exposure apparatus comprising:

an illumination system arranged to illuminate a mask having an exposure pattern;

a projection system arranged to project an image of the exposure pattern onto a photosensitive substrate having a detecting mark; and a position detecting apparatus arranged to detect the detecting mark;

wherein the position detecting apparatus comprises:

a detection optical system arranged to obtain an optical information including a position of the detecting mark;

a detector including a detecting area and arranged to convert the optical information into an electrical signal;

a memory unit that stores an error information arising according to a detecting position of the detecting area;

a correction processor, electrically connected to the detector and the memory unit, that corrects the electrical signal based on the error information, and generates a correcting signal, the error information having been obtained at a time prior to a time when the optical information that is being corrected was obtained from the detection optical system; and a detecting unit, electrically connected to the correction processor, that detects a position of the detecting mark based on the correcting signal.

19. The exposure apparatus according to claim 18, further comprising a detecting illumination system arranged to illuminate the detecting mark;

wherein the detection optical system includes an imaging optical system arranged to form an image of the detecting mark based on light from the detecting mark.

20. A method for fabricating a semiconductor device or a liquid crystal device by using the exposure apparatus according to claim 19, comprising the steps of:

illuminating the mask with light having a predetermined wavelength by using the illumination system; and projecting the image of the exposure pattern formed on the mask onto the substrate by using the projection system.

21. The exposure apparatus according to claim 18, wherein the error information stored by the memory unit includes a measuring information obtained by a criterion object having a criterion pattern.

22. The exposure apparatus according to claim 21, wherein the error information further includes a manufacturing error of the criterion pattern.

23. A method for fabricating a semiconductor device or a liquid crystal device by using the exposure apparatus according to claim 22, comprising the steps of:

illuminating the mask with light having a predetermined wavelength by using the illumination system; and projecting the image of the exposure pattern formed on the mask onto the substrate by using the projection system.

24. The exposure apparatus according to claim 21, wherein the measuring information of the criterion object includes a first detection information with respect to the criterion pattern set under a first condition and a second detection information with respect to the criterion pattern set under a second condition.

25. A method for fabricating a semiconductor device or a liquid crystal device by using the exposure apparatus according to claim 24, comprising the steps of:

illuminating the mask with light having a predetermined wavelength by using the illumination system; and projecting the image of the exposure pattern formed on the mask onto the substrate by using the projection system.

26. A method for fabricating a semiconductor device or a liquid crystal device by using the exposure apparatus according to claim 21, comprising the steps of:

illuminating the mask with light having a predetermined wavelength by using the illumination system; and projecting the image of the exposure pattern formed on the mask onto the substrate by using the projection system.

27. The exposure apparatus according to claim 18, further comprising a stage that supports the photosensitive substrate and has a criterion pattern to correct a detecting result of the position detecting apparatus;

wherein the error information stored by the memory unit includes a measuring information of the criterion pattern obtained by using the position detecting apparatus.

28. A method for fabricating a semiconductor device or a liquid crystal device by using the exposure apparatus according to claim 27, comprising the steps of:

illuminating the mask with light having a predetermined wavelength by using the illumination system; and projecting the image of the pattern formed on the mask onto the substrate by using the projection system.

29. A method for fabricating a semiconductor device or a liquid crystal device by using the exposure apparatus according to claim 18, comprising the steps of:

illuminating the mask with light having a predetermined wavelength by using the illumination system; and projecting the image of the exposure pattern formed on the mask onto the substrate by using the projection system.

30. The exposure apparatus of claim 18, wherein the stored error information is based on at least one detected distance within a known pattern.

31. The exposure apparatus of claim 18, wherein the correcting signal compensates for error in the electrical signal due to at least one of a manufacturing error of the detection optical system, a residual optical error of the detection optical system and an electrical error caused by a manufacturing error of the exposure apparatus.

32. An exposure apparatus comprising:
an illumination system arranged to illuminate a mask having an exposure pattern;
a projection system arranged to project an image of the exposure pattern onto a photosensitive substrate having a detecting mark; and
a position detecting apparatus arranged to detect the detecting mark;
wherein the position detecting apparatus comprises:
a detection optical system arranged to obtain an optical information including a position of the detecting mark;
a detector including a detecting area and arranged to convert the optical information into an electrical signal;
a memory unit that stores an error information about the position detecting apparatus with respect to at least one of a manufacturing error in the detection optical system, a residual optical error in the detection optical system and an electrical error caused by a manufacturing error in the position detecting apparatus;
a correction processor, electrically connected to the detector and the memory unit, that corrects the electrical signal based on the error information in order to compensate for at least one of the manufacturing error of the detection optical system, the residual optical error of the detection optical system and the electrical error caused by the manufacturing error of the position detecting apparatus, and generates a correcting signal; and
a detecting unit, electrically connected to the correction processor, that detects a position of the object based on the correcting signal.

33. The exposure apparatus according to claim 32, further comprising a detecting illumination system arranged to illuminate the detecting mark;
wherein the detection optical system includes an imaging optical system arranged to form an image of the detecting mark based on light from the detecting mark.

34. A method for fabricating a semiconductor device or a liquid crystal device by using the exposure apparatus according to claim 30, comprising the steps of:
illuminating the mask with light having a predetermined wavelength by using the illumination system; and
projecting the image of the exposure pattern formed on the mask onto the substrate by using the projection system.

35. The exposure apparatus according to claim 32, wherein the error information stored by the memory unit includes a measuring information obtained by a criterion object having a criterion pattern.

36. The exposure apparatus according to claim 35, wherein the error information further includes a manufacturing error of the criterion pattern.

37. A method for fabricating a semiconductor device or a liquid crystal device by using the exposure apparatus according to claim 36, comprising the steps of:
illuminating the mask with light having a predetermined wavelength by using the illumination system; and
projecting the image of the exposure pattern formed on the mask onto the substrate by using the projection system.

38. The exposure apparatus according to claim 35, wherein the measuring information of the criterion object includes a first detection information with respect to the criterion pattern set under a first condition and a second detection information with respect to the criterion pattern set under a second condition.

39. A method for fabricating a semiconductor device or a liquid crystal device by using the exposure apparatus according to claim 38, comprising the steps of:
illuminating the mask with light having a predetermined wavelength by using the illumination system; and
projecting the image of the exposure pattern formed on the mask onto the substrate by using the projection system.

40. A method for fabricating a semiconductor device or a liquid crystal device by using the exposure apparatus according to claim 35, comprising the steps of:
illuminating the mask with light having a predetermined wavelength by using the illumination system; and
projecting the image of the exposure pattern formed on the mask onto the substrate by using the projection system.

41. The exposure apparatus according to claim 32, further comprising a stage that supports the photosensitive substrate and has a criterion pattern to correct a detecting result of the position detecting apparatus;
wherein the error information stored by the memory unit includes a measuring information of the criterion pattern obtained by using the position detecting apparatus.

42. A method for fabricating a semiconductor device or a liquid crystal device by using the exposure apparatus according to claim 41, comprising the steps of:
illuminating the mask with light having a predetermined wavelength by using the illumination system; and
projecting the image of the exposure pattern formed on the mask onto the substrate by using the projection system.

43. A method for fabricating a semiconductor device or a liquid crystal device by using the exposure apparatus according to claim 32, comprising the steps of:
illuminating the mask with light having a predetermined wavelength by using the illumination system; and
projecting the image of the exposure pattern formed on the mask onto the substrate by using the projection system.

44. The exposure apparatus of claim 32, wherein the error information having been obtained at a time prior to a time when the optical information that is being corrected was obtained from the detection optical system.

45. A method for detecting a position of an object by using a position detecting apparatus that includes a detection optical system that obtains an optical information with respect to the object and a detector that converts the optical information into an electrical information by using a detecting area, comprising the steps of:
obtaining an error information arising according to a detecting position of the detecting area;
obtaining the electrical information of the object by using the detector; and
correcting the obtained electrical information of the object based on the obtained error information, the error information having been obtained at a time prior to a time when the optical information that is being corrected was obtained from the detection optical system.

46. A method for detecting a position of an object by using a position detecting apparatus that includes a detection optical system that obtains an optical information with respect to the object and a detector that converts the optical information into an electrical information, comprising the steps of:

obtaining an error information about the position detecting apparatus with respect to at least one of a manufacturing error in the detection optical system, a residual optical error in the detection optical system and an electrical error caused by a manufacturing error in the position detecting apparatus;

obtaining the electrical information of the object by using the detector; and correcting the obtained electrical information of the object based on the obtained error information in order to compensate for at least one of the manufacturing error of the detection optical system, the residual optical error of the detection optical system and the electrical error caused by the manufacturing error of the position detecting apparatus.

47. A method for fabricating a semiconductor device or a liquid crystal device, comprising the steps of:

aligning at least a photosensitive substrate;

illuminating a mask with light having a predetermined wavelength; and projecting an image of a pattern formed on the mask onto the photosensitive substrate;

wherein the aligning step includes a detecting step of detecting a position of the photosensitive substrate by using a position detecting apparatus that includes a detection optical system that obtains an optical information with respect to the photosensitive substrate and a detector that converts the optical information into an electrical information by using a detecting area;

wherein the detecting step comprises the steps of:

obtaining an error information arising according to a detecting position of the detecting area;

obtaining the electrical information of the object by using the detector; and correcting the obtained electrical information of the photosensitive substrate based on the obtained error information, the error information having been obtained at a time prior to a time when the optical information that is being corrected was obtained from the detection optical system.

48. A method for fabricating a semiconductor device or a liquid crystal device, comprising the steps of:

aligning at least a photosensitive substrate;

illuminating a mask with light having a predetermined wavelength; and projecting an image of a pattern formed on the mask onto the photosensitive substrate;

wherein the aligning step includes a detecting step of detecting a position of the photosensitive substrate by using a position detecting apparatus that includes a detection optical system that obtains an optical information with respect to the photosensitive substrate and a detector that converts the optical information into an electrical information;

wherein the detecting step comprises the steps of:

obtaining an error information about the position detecting apparatus with respect to at least one of a manufacturing error in the detection optical system, a residual optical error in the detection optical system and an electrical error caused by a manufacturing error in the position detecting apparatus;

obtaining the electrical information of the object by using the detector; and correcting the obtained electrical information of the photosensitive substrate based on the obtained error information in order to compensate for at least one of the manufacturing error of the detection optical system, the residual optical error of the detection optical system and the electrical error caused by the manufacturing error of the position detecting apparatus.

* * * * *